United States Patent
Tsukahara (10) Patent No.: US 12,313,013 B2
(45) Date of Patent: May 27, 2025

(54) METHOD FOR CONTROLLING OPERATION MODES OF GAS TURBINE SYSTEM

(71) Applicant: MITSUBISHI HEAVY INDUSTRIES, LTD., Tokyo (JP)

(72) Inventor: Akitomo Tsukahara, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/273,432

(22) PCT Filed: Mar. 23, 2022

(86) PCT No.: PCT/JP2022/013374
§ 371 (c)(1),
(2) Date: Jul. 20, 2023

(87) PCT Pub. No.: WO2022/202869
PCT Pub. Date: Sep. 29, 2022

(65) Prior Publication Data
US 2024/0093649 A1    Mar. 21, 2024

(30) Foreign Application Priority Data
Mar. 26, 2021   (JP) .................................. 2021-053915

(51) Int. Cl.
*F02C 9/54*    (2006.01)
*F01D 15/10*   (2006.01)
*F02C 7/042*   (2006.01)

(52) U.S. Cl.
CPC ............... *F02C 9/54* (2013.01); *F01D 15/10* (2013.01); *F02C 7/042* (2013.01)

(58) Field of Classification Search
CPC .................................... F02C 9/54; F01D 15/10
See application file for complete search history.

(56) References Cited

U.S. PATENT DOCUMENTS

2006/0150633 A1    7/2006   McGinley et al.
2007/0031238 A1    2/2007   Fujii et al.
(Continued)

FOREIGN PATENT DOCUMENTS

JP    2003-148173    5/2003
JP    2004-522052    7/2004
(Continued)

OTHER PUBLICATIONS

International Search Report issued Jun. 14, 2022 in corresponding International Application No. PCT/JP2022/013374, with English translation.

(Continued)

*Primary Examiner* — Gerald L Sung
*Assistant Examiner* — Jacek Lisowski
(74) *Attorney, Agent, or Firm* — Wenderoth, Lind & Ponack, L.L.P.

(57) ABSTRACT

A gas turbine system and control method for the gas turbine system that includes a gas turbine having a compressor for producing compressed air, a combustor for burning fuel with the compressed air, a turbine driven by a combustion gas generated by burning the fuel in the combustor, and an inlet guide vane for adjusting an intake air amount of the compressor; an inlet guide vane control device for controlling an opening degree of the inlet guide vane; and a motor generator drivable by the turbine and capable of providing rotational power to the gas turbine by electric power supplied from outside the gas turbine. The inlet guide vane control device controls the opening degree of the inlet guide vane to be an opening degree greater than a minimum opening degree which is a minimum value of the opening degree of the inlet guide vane in a normal operation mode.

3 Claims, 4 Drawing Sheets

(56) References Cited

U.S. PATENT DOCUMENTS

| | | | | |
|---|---|---|---|---|
| 2010/0005808 A1* | 1/2010 | Nanataki | ............... | F02C 3/10 |
| | | | | 60/722 |
| 2012/0017600 A1* | 1/2012 | Saito | ............... | F02C 3/10 |
| | | | | 60/773 |
| 2014/0000272 A1* | 1/2014 | Fichtner | ............... | F02C 9/20 |
| | | | | 60/773 |
| 2014/0053567 A1* | 2/2014 | Langenbacher | ........ | F01D 15/10 |
| | | | | 60/773 |
| 2014/0216047 A1* | 8/2014 | Morisaki | ............... | F02C 7/36 |
| | | | | 60/774 |
| 2015/0171705 A1* | 6/2015 | Hino | ............... | H02K 7/1823 |
| | | | | 290/1 A |
| 2017/0138272 A1* | 5/2017 | Kusumi | ............... | H02K 7/14 |
| 2020/0400079 A1 | 12/2020 | Takahashi et al. | | |

FOREIGN PATENT DOCUMENTS

| | | |
|---|---|---|
| JP | 2007-40171 | 2/2007 |
| JP | 2014-47728 | 3/2014 |
| JP | 2014-114707 | 6/2014 |
| JP | 2019-143563 | 8/2019 |
| WO | 02/088531 | 11/2002 |

OTHER PUBLICATIONS

International Preliminary Report on Patentability mailed Oct. 5, 2023 in corresponding International Application No. PCT/JP2022/013374, with English translation.

* cited by examiner

METHOD FOR CONTROLLING OPERATION MODES OF GAS TURBINE SYSTEM

TECHNICAL FIELD

The present disclosure relates to a gas turbine system and a control method therefor.

This application claims the priority of Japanese Patent Application No. 2021-053915 filed on Mar. 26, 2021, the content of which is incorporated herein by reference.

BACKGROUND

For example, Patent Document 1 describes power generation by driving a generator with a gas turbine.

CITATION LIST

Patent Literature

Patent Document 1: JP2014-47728A

SUMMARY

Technical Problem

A design within an exhaust passage of a gas turbine typically carried out in consideration of a flow of a high-temperature combustion gas during normal operation of the gas turbine. As such, the design within the exhaust passage may not be optimal for the flow of the combustion gas in a reverse power operation mode where rotational power is provided to the gas turbine by electrical power from outside. In particular, a strut shield disposed in the exhaust passage is a part subjected to a high load due to the flow of the combustion gas and requires special measures.

In view of the above, an object of at least one embodiment of the present disclosure is to provide a gas turbine system and a control method therefor that can decrease the load on the strut shield in the reverse power operation mode.

Solution to Problem

In order to achieve the above object, a gas turbine system according to the present disclosure, includes: a gas turbine which includes a compressor for producing compressed air, a combustor for burning fuel with the compressed air, a turbine driven by a combustion gas generated by burning the fuel in the combustor, and an inlet guide vane for adjusting an intake air amount of the compressor; an inlet guide vane control device for controlling an opening degree of the inlet guide vane; and a motor generator drivable by the turbine and capable of providing rotational power to the gas turbine by electric power supplied from outside the gas turbine. The inlet guide vane control device controls the opening degree of the inlet guide vane to be an opening degree greater than a minimum opening degree which is a minimum value of the opening degree of the inlet guide vane in a normal operation mode which is an operation mode where the motor generator is driven by the turbine, in a reverse power operation mode which is an operation mode where the motor generator provides the rotational power to the gas turbine.

Further, a control method for a gas turbine system according to the present disclosure is a control method for a gas turbine system that includes a gas turbine which includes a compressor for producing compressed air, a combustor for burning fuel with the compressed air, a turbine driven by a combustion gas generated by burning the fuel in the combustor, and an inlet guide vane for adjusting an intake air amount of the compressor; and a motor generator drivable by the turbine and capable of providing rotational power to the gas turbine by electric power supplied from outside the gas turbine, the control method for the gas turbine system, including: controlling the opening degree of the inlet guide vane to be an opening degree greater than a minimum opening degree which is a minimum value of the opening degree of the inlet guide vane in a normal operation mode which is an operation mode where the motor generator is driven by the turbine, in a reverse power operation mode which is an operation mode where the motor generator provides the rotational power to the gas turbine.

Advantageous Effects

With the gas turbine system and a control method therefor of the present disclosure, since the opening degree of the inlet guide vane in the reverse power operation mode is controlled to be an opening degree which is greater than the minimum opening degree of the inlet guide vane in the normal operation mode, the axial velocity of the combustion gas discharged from the last stage rotor blade of the turbine increases compared to the case where the opening degree of the inlet guide vane is the minimum opening degree. Then, the swirl angle of the combustion gas in the reverse power operation mode decreases, reducing the difference from the swirl angle of the combustion gas in the normal operation mode. As a result, the circumferential load acting on the strut shield is decreased compared to the case where the opening degree of the inlet guide vane is the minimum opening degree, making it possible to decrease the load on the strut shield in the reverse power operation mode.

DETAILED DESCRIPTION

Hereinafter, a gas turbine system and a control method therefor according to the embodiments of the present disclosure will be described with reference to the drawings. The embodiment to be described below indicates one aspect of the present disclosure, does not intend to limit the disclosure, and can optionally be modified within a range of a technical idea of the present disclosure.

Figure 1:
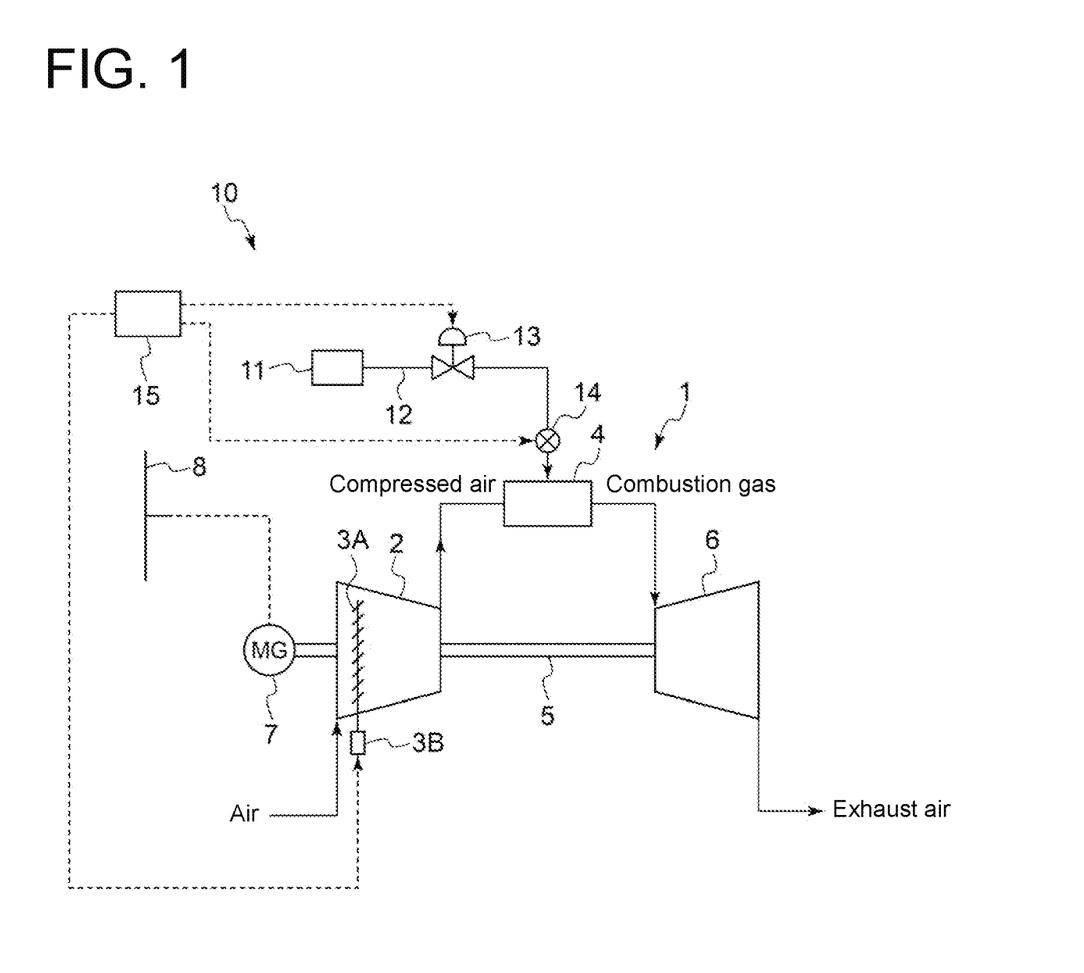
FIG. 1 is a configuration diagram of a gas turbine system according to an embodiment of the present disclosure.

Configuration of Gas Turbine System According to Embodiment of Present Disclosure As shown in FIG. 1, a gas turbine system 10 according to an embodiment of the present disclosure includes a gas turbine 1 that includes a combustor 4 for burning fuel to generate a combustion gas, a compressor 2 for supplying compressed air serving as combustion air to the combustor 4, and a turbine 6 which shares a common rotational shaft 5 with the compressor 2 and is configured to be driven by the combustion gas generated by the combustor 4. The rotational shaft 5 is connected to a motor generator 7, and the motor generator 7 is configured to be electrically connectable to a power system 8 outside the gas turbine 1. An inlet of the compressor 2 is provided with an inlet guide vane (IGV) 3A for adjusting an intake air amount. The opening degree of the IGV 3A is configured to be adjustable by an actuator 3B (inlet guide vane control device).

The combustor 4 is configured to be supplied with fuel from a fuel supply source 11 via a fuel supply line 12. The fuel supply line 12 is provided with a fuel control valve 13 (fuel flow control device) for regulating the flow rate (fuel supply amount) of the fuel supplied to the combustor 4, and a pilot ratio control part 14 for adjusting the pilot ratio which is the ratio of a fuel supply amount to a pilot nozzle (not shown) to a fuel supply amount to the combustor 4 (for example, a control valve for controlling fuel supply amounts to the pilot nozzle (not shown) and a main nozzle (not shown)). The fuel control valve 13 and the pilot ratio control part 14, and the actuator 3B are electrically connected to a controller 15.

The controller 15 includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. A configuration where the program is installed in the ROM or another storage medium in advance, a configuration where the program is provided in a state of being stored in the computer-readable storage medium, a configuration where the program is distributed via a wired or wireless communication means, or the like may be applied. The computer-readable storage medium is a magnetic disk, a magneto-optical disk, a CD-ROM, a DVD-ROM, a semiconductor memory, or the like.

Figure 2:
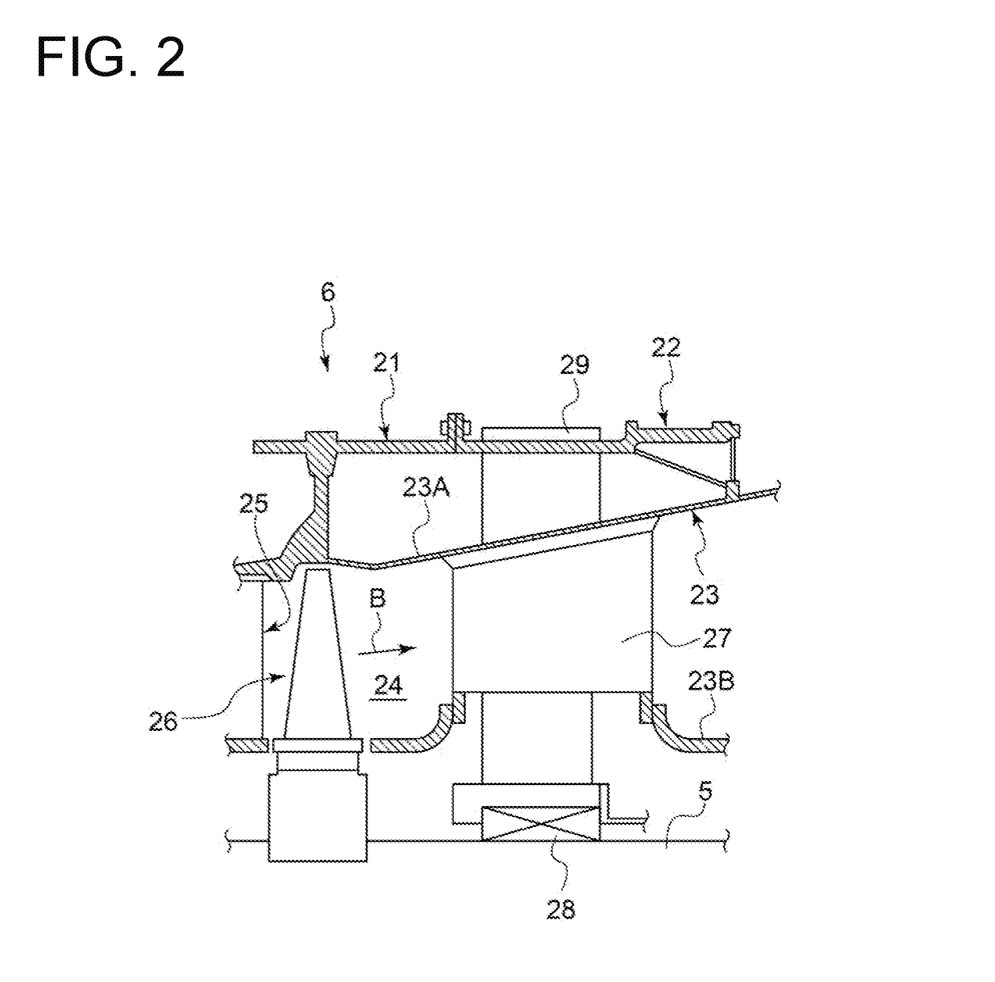
FIG. 2 is a cross-sectional view of a portion of a turbine of a gas turbine for the gas turbine system according to an embodiment of the present disclosure.

As shown in FIG. 2, the turbine 6 of the gas turbine 1 includes an outer casing with a turbine casing 21 and an exhaust casing 22, and an inner casing with an exhaust diffuser 23. A gas pass 24 is formed in the turbine 6 by the turbine casing 21, and the gas pass 24 includes a plurality of stages of stator vanes 25 and a plurality of stages of rotor blades 26, which are alternately disposed along a flow direction B of a combustion gas flowing through the gas pass 24. FIG. 2 shows only the last stage stator vane 25 and rotor blade 26. The exhaust diffuser 23 is configured by connecting an outer diffuser 23A and an inner diffuser 23B each forming a cylindrical (circular) shape with a strut shield 27. The rotational shaft 5 is rotatably supported by a bearing part 28, and the bearing part 28 is supported from the exhaust casing 22 via a strut 29. The strut shield 27 includes the strut 29 disposed therein.

Operation of Gas Turbine System According to Embodiment of Present Disclosure Next, an operation of the gas turbine system 10 according to an embodiment of the present disclosure will be described. As shown in FIG. 1, the gas turbine system 10 can operate by appropriately switching between a normal operation mode which is an operation mode where the motor generator 7 is driven by the turbine 6, and a reverse power operation mode which is an operation mode where the motor generator 7 provides rotational power to the gas turbine 1.

In the normal operation mode, compressed air is supplied from the compressor 2 to the combustor 4, and fuel is supplied from the fuel supply source 11 to the combustor 4 via the fuel supply line 12, thereby burning the fuel to generate a combustion gas. The combustion gas is supplied to the turbine 6 to drive, that is, to rotate the turbine 6, the rotation of the turbine 6 is transmitted to the motor generator 7 via the rotational shaft 5, and the motor generator 7 is driven as a generator. The electric power generated by the motor generator 7 is supplied to the power system 8.

On the other hand, in the reverse power operation mode, electric power is supplied to the motor generator 7 from the power system 8 outside the gas turbine 1, whereby the motor generator 7 is driven as the motor. The rotational power generated by the motor generator 7 is provided to the gas turbine 1 to assist the operation of the gas turbine 1. Therefore, the reverse power operation mode generally consumes less fuel than the normal operation mode.

Figure 3:
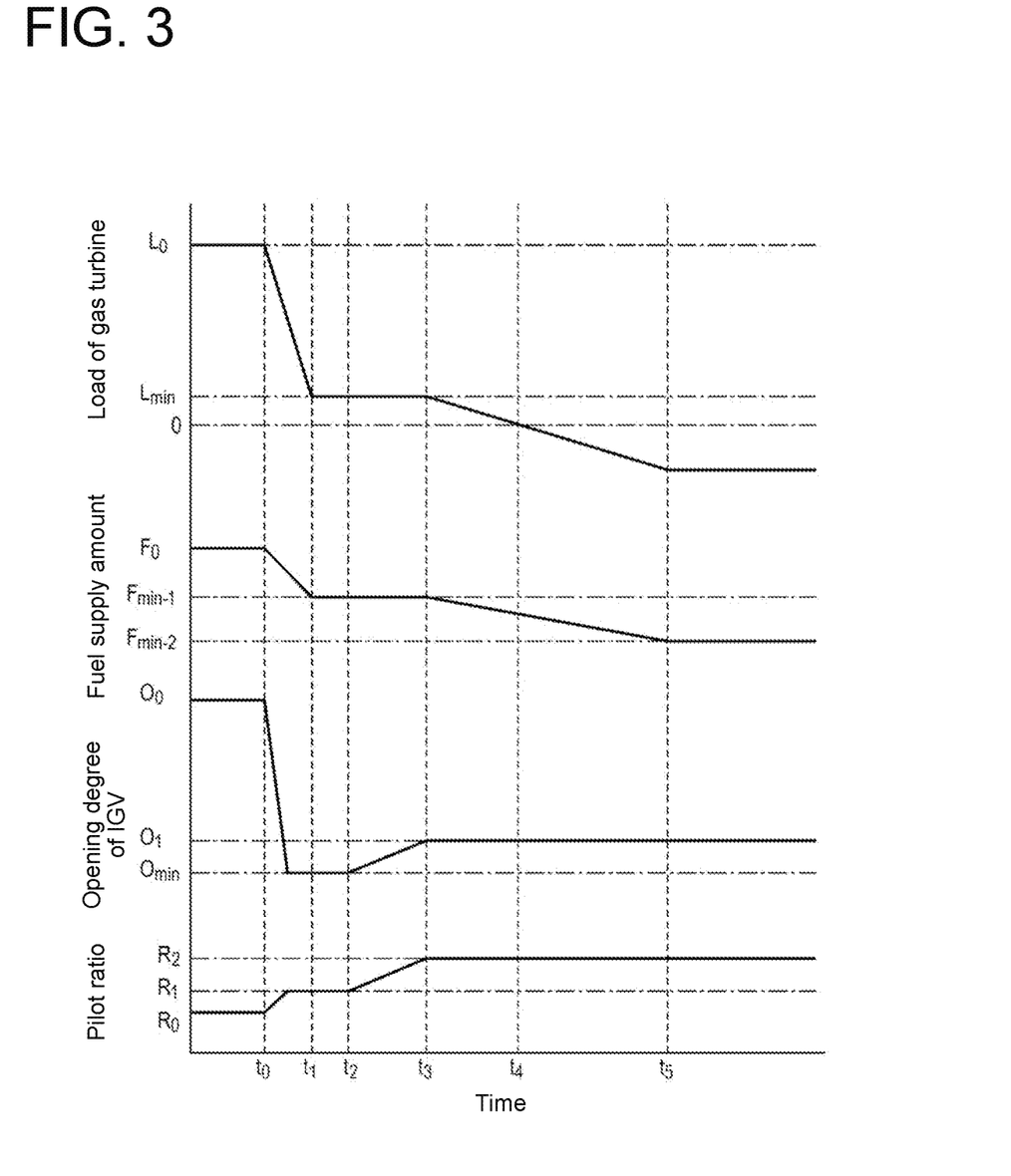
FIG. 3 is a timing chart showing temporal changes of various items when the gas turbine system transitions from a normal operation mode to a reverse power operation mode according to an embodiment of the present disclosure.

Control Method for Gas Turbine System According to Embodiment of Present Disclosure Next, a control method for the gas turbine system 10 will be described with reference to FIGS. 1 and 2 and a timing chart of FIG. 3. The timing chart of FIG. 3 shows temporal changes of various items when the gas turbine system 10 transitions from the normal operation mode to the reverse power operation mode. Until time $t_0$, the gas turbine system 10 operates at a prescribed load $L_0$ in the normal operation mode. At the time $t_0$, an operator of the gas turbine system 10 starts a preparation to start switching to the reverse power operation mode at time $t_2$ described later. Based on the operator's operation at the time $t_0$, the controller 15 controls the opening degree of the fuel control valve 13, thereby starting decreasing the fuel supply amount to the combustor 4 from an initial fuel supply amount $F_0$. Consequently, the load of the gas turbine system 10 starts to decrease.

Further, at the time $t_0$, the controller 15 controls the actuator 3B, thereby starting decreasing the opening degree of the IGV 3A from an initial opening degree $O_0$. Consequently, as the fuel supply amount to the combustor 4 decreases, the intake air amount of the compressor 2 decreases, and thus the amount of the compressed air supplied to the combustor 4 decreases, making it possible to enter a state where the combustor 4 is unlikely to misfire. Furthermore, at the time $t_0$, the controller 15 controls the pilot ratio control part 14, thereby starting increasing the pilot ratio from an initial pilot ratio $R_0$. Consequently, even if the fuel supply amount to the combustor 4 decreases, a state is possible in which the combustor 4 is more unlikely to misfire.

At time $t_1$, the load of the gas turbine system 10 becomes a minimum load $L_{min}$ in the normal operation mode (that is, the fuel supply amount to the combustor 4 becomes a first minimum supply amount $F_{min-1}$ in the normal operation mode). Shortly before reaching the time $t_1$, the opening degree of the IGV 3A is decreased to a minimum opening degree $O_{min}$ which is a minimum value of the opening degree of the IGV 3A in the normal operation mode, and the pilot ratio is increased to a constant value $R_1$. Such operating conditions are maintained until a predetermined time elapses from the time $t_1$, that is, until the time $t_2$. Herein, the minimum opening degree $O_{min}$ in the normal operation mode need not be a minimum value in the range of opening and closing motion of the IGV 3A or a minimum value in the range that can prevent misfire, and will suffice if it is a minimum value of the opening degree of the IGV 3A set in the normal operation mode. As in the present embodiment shown in FIG. 3, the minimum value of the opening degree of the IGV 3A in the normal operation mode is generally a value which is set when the gas turbine operates at the minimum load $L_{min}$.

At the time $t_2$, for example, the operator of the gas turbine system 10 presses an operation mode switch button to start switching from the normal operation mode to the reverse power operation mode. The controller 15 controls the actuator 3B, thereby starting increasing the opening degree of the IGV 3A at a constant first increase rate, and controls the pilot ratio control part 14, thereby starting increasing the pilot ratio at a constant second increase rate. At time $t_3$, the controller 15 stops increasing the opening degree of the IGV 3A, and after the time $t_3$, the opening degree of the IGV 3A is maintained at an opening degree $O_1$ which is greater than the minimum opening degree $O_{min}$. Further, the controller 15 stops increasing the pilot ratio, and after the time $t_3$, the pilot ratio is maintained at $R_2$ which is greater than $R_1$.

As described above, when the operation mode switch button is pressed, the controller 15 performs control to establish the condition for transition into the reverse power operation mode, such as the opening degree of the IGV 3A or the pilot ratio. By increasing the opening degree of the IGV 3A before decreasing the fuel supply amount to a lower limit value in the reverse power operation mode, it is possible to prevent in advance the circumferential load acting on the strut seal from increasing, when the fuel supply amount is decreased from the first minimum supply amount $F_{min-1}$ which is the minimum fuel supply amount in the normal operation mode to a second minimum supply amount $F_{min-2}$ (described later) which is the minimum fuel supply amount in the reverse power operation mode. Further, the risk of misfire can be suppressed by increasing the pilot ratio at the second constant increase rate so as to respond to increasing the opening degree of the IGV 3A at the first constant increase rate.

At the time $t_3$, the controller 15 controls the opening degree of the fuel control valve 13, thereby starting decreasing the fuel supply amount to the combustor 4. Consequently, the load of the gas turbine system 10 starts to decrease. Although the load of the gas turbine system 10 becomes zero at time $t_4$, the fuel supply amount to the combustor 4 further continues to decrease, and thus after the time $t_4$, electric power is supplied from the power system 8 to the motor generator 7. Therefore, after the time $t_4$, the motor generator 7 is driven as the motor, and the rotational power generated by the motor generator 7 is provided to the gas turbine 1. After the time $t_4$, as the amount of the electric power supplied from the power system 8 to the motor generator 7 increases, the amount of the rotational power provided from the motor generator 7 to the gas turbine 1 increases.

At time $t_5$, when the fuel supply amount reaches the minimum value of the fuel supply amount to the combustor 4, which is set as the lower limit value in the reverse power operation mode, that is, the second minimum supply amount $F_{min-2}$, the controller 15 stops the decrease in the fuel supply amount to the combustor 4, whereby after the time $t_5$, the fuel supply amount is maintained at the second minimum supply amount $F_{min-2}$ which is smaller than the first minimum supply amount $F_{min-1}$. At the time $t_5$, the operation of switching to the reverse power operation mode is completed.

Figure 4:
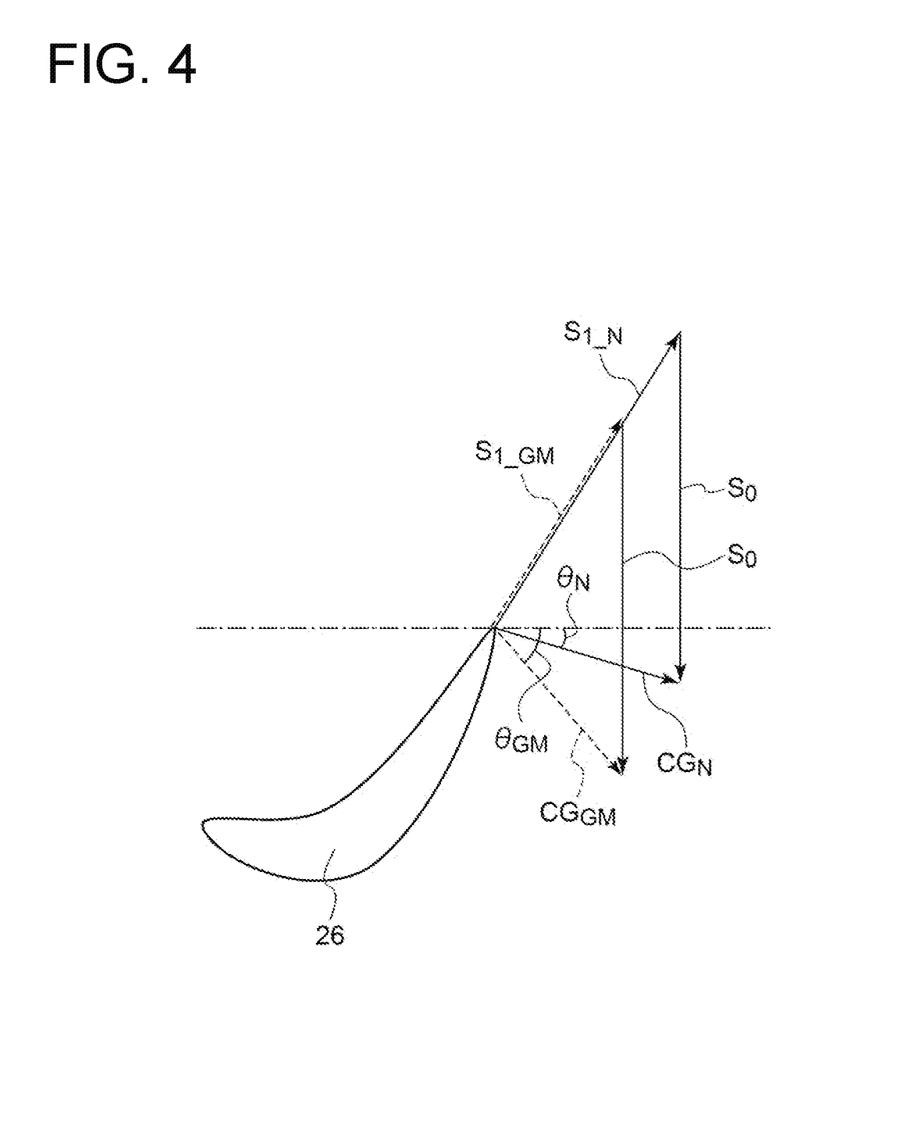
FIG. 4 is a view for describing a circumferential load acting on a strut shield in each of the normal operation mode and the reverse power operation mode.

As shown in FIG. 4, in the normal operation mode, if a rotational speed of the rotational shaft 5 is $S_0$ and a relative velocity of the combustion gas discharged from the last stage rotor blade 26 of the turbine 6 to $S_0$ is $S_{1\_N}$, a flow of the combustion gas as viewed in a static coordinate system is $CG_N$ and a swirl angle is $\theta_N$. On the other hand, in the reverse power operation mode, since the fuel supply amount to the combustor 4 is smaller than in the normal operation mode, the temperature of the combustion gas decreases and the density of the combustion gas increases. Then, the relative velocity of the combustion gas discharged from the rotor blade 26 to $S_0$ becomes $S_{1\_GM}$ which is lower than $S_{1\_N}$. Then, since the rotational speed of the rotational shaft 5 is constant at $S_0$ in each of the normal operation mode and the reverse power operation mode, a flow of the combustion gas as viewed in the stationary coordinate system in the reverse power operation mode is $CG_{GM}$ and a swirl angle is $\theta_{GM}$. Since $\theta_{GM} > \theta_N$, in the reverse power operation mode, the circumferential load of the combustion gas discharged from the rotor blades 26, which acts on the strut shield, is large compared to the normal operation mode.

By contrast, in the present embodiment, since the opening degree of the IGV 3A in the reverse power operation mode is controlled to be the opening degree $O_1$ which is greater than the minimum opening degree $O_{min}$ of the IGV3A in the normal operation mode, an axial velocity of the combustion gas discharged from the last stage rotor blade 26 of the turbine 6 increases compared to a case where the opening degree of the IGV 3A is the minimum opening degree $O_{min}$. Then, the swirl angle $\theta_{GM}$ of the combustion gas in the reverse power operation mode decreases, reducing a difference from the swirl angle $\theta_N$ of the combustion gas in the normal operation mode. As a result, the circumferential load acting on the strut shield 27 is decreased compared to the case where the opening degree of the IGV 3A is the minimum opening degree $O_{min}$, making it possible to decrease the load on the strut shield 27 in the reverse power operation mode.

Modified Example of Control Method for Gas Turbine System According to Embodiment of Present Disclosure In the present embodiment, the opening degree of the IGV 3A is increased before the fuel supply amount is decreased from the minimum fuel supply amount in the normal operation mode to the minimum fuel supply amount in the reverse power operation mode but, the present disclosure is not limited to this form. However, by setting the opening degree of the IGV 3A to the opening degree $O_1$ greater than the minimum opening degree $O_{min}$ before the fuel supply amount is decreased to the minimum fuel supply amount in the reverse power operation mode, it is possible to suppress in advance the increase in the circumferential load acting on the strut shield 27. Further, simply increasing the opening degree of the IGV 3A increases the risk of misfire of the combustor 4. Therefore, in the present embodiment, the risk of the misfire is suppressed by increasing the pilot ratio. However, the present disclosure is not limited to this form. It is also possible not to increase the pilot ratio if the risk of the misfire is tolerable. Further, in the present embodiment, the risk of the misfire is further suppressed by increasing the pilot ratio at the constant second increase rate in accordance with increasing the opening degree of the IGV 3A at the constant first increase rate. However, the present disclosure is not limited to this form, and the opening degree of the IGV 3A and the pilot ratio may be increased asynchronously, or one or both of them can also be increased at a non-constant increase rate.

In the present embodiment, the opening degree of the IGV 3A is decreased to the minimum opening degree $O_{min}$ in the normal operation mode and then the opening degree of the IGV 3A is increased from the minimum opening degree $O_{min}$ to the opening degree $O_1$ during switching to the reverse power operation mode. However, the present disclosure is not limited to this form, and the opening degree of the IGV 3A is not decreased to the minimum opening degree $O_{min}$ but is decreased to the opening degree $O_1$ in the normal operation mode, and thereafter the decreased opening degree may be maintained. However, by performing control such that the opening degree of the IGV 3A is decreased to the minimum opening degree $O_{min}$ and then increased from the minimum opening degree $O_{min}$ to the opening degree $O_1$, the opening degree can be set to an appropriate opening degree at which the increase in the circumferential load acting on the strut shield 27 is suppressed, while reducing the possibility of the misfire of the combustor 4.

In the present embodiment, electric power is supplied from the power system 8 to the motor generator 7 as electric power supplied from outside the gas turbine 1 in the reverse power operation mode. However, the present disclosure is not limited to this form. The motor generator 7 may be supplied with electric power that is excessive in another plant or the like.

The contents described in the above embodiments would be understood as follows, for instance.

[1] A gas turbine system according to one aspect, includes: a gas turbine (1) which includes a compressor (2) for producing compressed air, a combustor (4) for burning fuel with the compressed air, a turbine (6) driven by a combustion gas generated by burning the fuel in the combustor (4), and an inlet guide vane (3A) for adjusting an intake air amount of the compressor (2); an inlet guide vane control device (actuator 3B) for controlling an opening degree of the inlet guide vane (3A); and a motor generator (7) drivable by the turbine (6) and capable of providing rotational power to the gas turbine (1) by electric power supplied from outside the gas turbine (1). The inlet guide vane control device (3B) controls the opening degree of the inlet guide vane (3A) to be an opening degree ($O_1$) greater than a minimum opening degree ($O_{min}$) which is a minimum value of the opening degree of the inlet guide vane (3A) in a normal operation mode which is an operation mode where the motor generator (7) is driven by the turbine (6), in a reverse power operation mode which is an operation mode where the motor generator (7) provides the rotational power to the gas turbine (1).

With the gas turbine system of the present disclosure, since the opening degree of the inlet guide vane in the reverse power operation mode is controlled to be the opening degree which is greater than the minimum opening degree of the inlet guide vane in the normal operation mode, the axial velocity of the combustion gas discharged from the last stage rotor blade of the turbine increases compared to the case where the opening degree of the inlet guide vane is the minimum opening degree. Then, the swirl angle of the combustion gas in the reverse power operation mode decreases, reducing the difference from the swirl angle of the combustion gas in the normal operation mode. As a result, the circumferential load acting on the strut shield is decreased compared to the case where the opening degree of the inlet guide vane is the minimum opening degree, making it possible to decrease the load on the strut shield in the reverse power operation mode.

[2] A gas turbine system according to another aspect is the gas turbine system of [1], further including: a fuel flow control device (fuel control valve 13) for controlling a flow rate of the fuel supplied to the combustor (4). The fuel flow control device (13) decreases the flow rate of the fuel and the inlet guide vane control device (3B) increases the opening degree of the inlet guide vane (3A), during switching from the normal operation mode to the reverse power operation mode.

The opening degree of the inlet guide vane is the opening degree greater than the minimum opening degree in order to decrease the circumferential load acting on the strut shield in the reverse power operation mode. However, the combustor may misfire, if the opening degree of the inlet guide vane suddenly increases when the fuel supply amount to the combustor decreases. By contrast, with the above configuration [2], by increasing the opening degree of the inlet guide vane, it is possible to decrease the load on the strut shield while reducing the risk of the misfire of the combustor.

[3] A gas turbine system according to still another aspect is the gas turbine system of [2], wherein the fuel flow control device (13) decreases the flow rate of the fuel, during switching from the normal operation mode to the reverse power operation mode and after the opening degree of the inlet guide vane (3A) is increased.

With such configuration, by decreasing the flow rate of the fuel after the opening degree of the inlet guide vane is increased, it is possible to decrease the load on the strut shield while reducing the risk of the misfire of the combustor.

[4] A gas turbine system according to yet another aspect is the gas turbine system of [2] or [3], wherein the inlet guide vane control device (13) increases the opening degree of the inlet guide vane (3A) at a constant increase rate, during switching from the normal operation mode to the reverse power operation mode.

With such configuration, by increasing the opening degree of the inlet guide vane at the constant increase rate, it is possible to decrease the load on the strut shield while reducing the risk of the misfire of the combustor.

[5] A gas turbine system according to yet another aspect is the gas turbine system of any of [2] to [4], wherein the inlet guide vane control device (3B) decreases the opening degree of the inlet guide vane (3A) to the minimum opening degree ($O_{min}$) before switching from the normal operation mode to the reverse power operation mode, and increases the opening degree of the inlet guide vane (3A) from the minimum opening degree ($O_{min}$) during switching from the normal operation mode to the reverse power operation mode.

With such configuration, by performing control such that the opening degree of the inlet guide vane is increased from the minimum opening degree, the opening degree can be set to an appropriate opening degree at which the increase in the circumferential load acting on the strut shield is suppressed, while reducing the possibility of the misfire of the combustor.

[6] A control method for a gas turbine system according to one aspect is a control method for a gas turbine system (10) that includes: a gas turbine (1) which includes a compressor (2) for producing compressed air, a combustor (4) for burning fuel with the compressed air, a turbine (6) driven by a combustion gas generated by burning the fuel in the combustor (4), and an inlet guide vane (3A) for adjusting an intake air amount of the compressor (2); and a motor generator (7) drivable by the turbine (6) and capable of providing rotational power to the gas turbine (1) by electric power supplied from outside the gas turbine (1), the control method for the gas turbine system (10), including: controlling the opening degree of the inlet guide vane (3A) to be an opening degree ($O_1$) greater than a minimum opening degree ($O_{min}$) which is a minimum value of the opening degree of the inlet guide vane (3A) in a normal operation mode which is an operation mode where the motor generator (7) is driven by the turbine (6), in a reverse power operation mode which is an operation mode where the motor generator (7) provides the rotational power to the gas turbine (1).

With the control method for the gas turbine system of the present disclosure, since the opening degree of the inlet guide vane in the reverse power operation mode is controlled to be the opening degree which is greater than the minimum opening degree of the inlet guide vane in the normal operation mode, the axial velocity of the combustion gas discharged from the last stage rotor blade of the turbine increases compared to the case where the opening degree of the inlet guide vane is the minimum opening degree. Then, the swirl angle of the combustion gas in the reverse power operation mode decreases, reducing the difference from the swirl angle of the combustion gas in the normal operation mode. As a result, the circumferential load acting on the strut shield is decreased compared to the case where the opening degree of the inlet guide vane is the minimum opening degree, making it possible to decrease the load on the strut shield in the reverse power operation mode.

REFERENCE SIGNS LIST

1 Gas turbine
2 Compressor
3A Inlet guide vane (IGV)
3B Actuator (inlet guide vane control device)
4 Combustor
6 Turbine
7 Motor generator
10 Gas turbine system
13 Fuel control valve (fuel flow control device)

The invention claimed is:

1. A control method for a gas turbine system that includes:
a gas turbine which includes a compressor for producing compressed air, a combustor for burning fuel with the compressed air, a turbine driven by a combustion gas generated by burning the fuel in the combustor, an inlet guide vane for adjusting an intake air amount of the compressor, and a fuel flow control device for controlling a flow rate of the fuel supplied to the combustor; and
a motor generator drivable by the turbine and capable of providing rotational power to the gas turbine by electric power supplied from outside the gas turbine,
the control method for the gas turbine system, comprising:
before switching from a normal operation mode which is an operation mode where the motor generator is driven by the turbine to a reverse power operation mode which is an operation mode where the motor generator provides the rotational power to the gas turbine, decreasing an opening degree of the inlet guide vane to a minimum opening degree which is a minimum value of the opening degree of the inlet guide vane in the normal operation mode; and then
increasing the opening degree of the inlet guide vane from the minimum opening degree while switching from the normal operation mode to the reverse power operation mode such that the fuel flow control device decreases the flow rate of the fuel so as to decrease the flow rate of the fuel in the reverse power operation mode.

2. The control method according to claim 1, further comprising decreasing the flow rate of the fuel during the switching from the normal operation mode to the reverse power operation mode and after the increasing of the opening degree of the inlet guide vane.

3. The control method according to claim 1, wherein the opening degree of the inlet guide vane is increased at a constant rate during the switching from the normal operation mode to the reverse power operation mode.

* * * * *